UNITED STATES PATENT OFFICE.

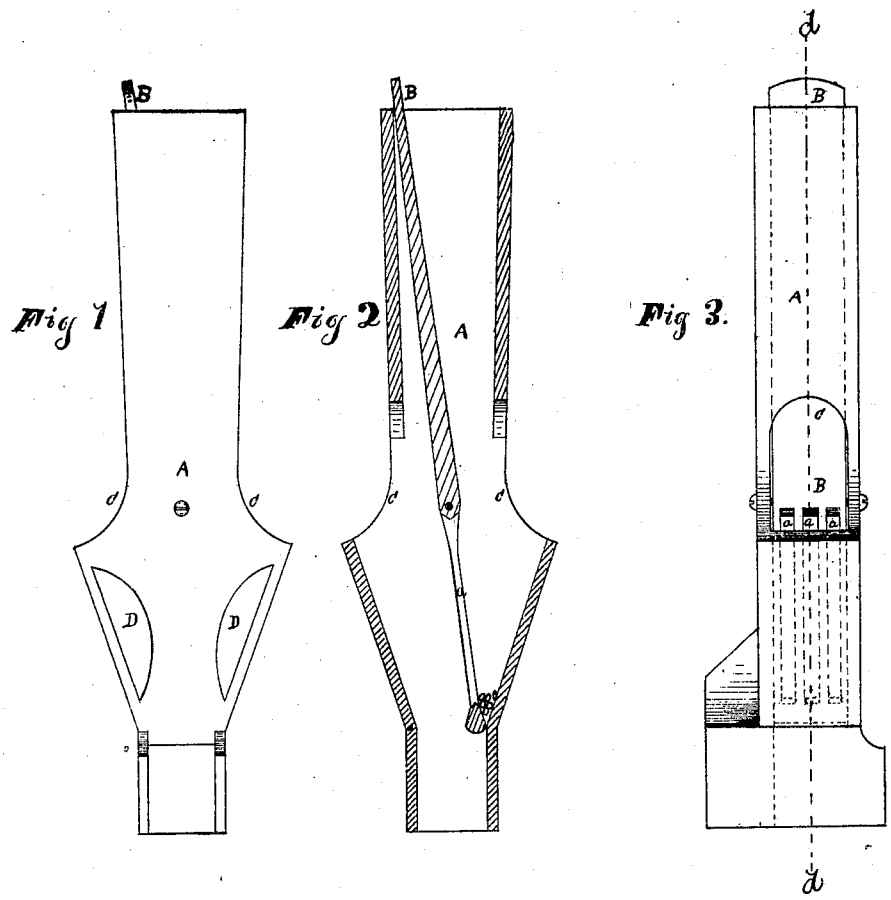

LEVI SCOFIELD, OF WATERTOWN, ASSIGNOR TO HIMSELF AND JUSTIN B. WAIT, OF FARMINGTON, WISCONSIN.

IMPROVEMENT IN SEED-TUBES FOR CORN-PLANTERS.

Specification forming part of Letters Patent No. 112,741, dated March 14, 1871.

*To all whom it may concern:*

Be it known that I, LEVI SCOFIELD, of Watertown, in the county of Jefferson and State of Wisconsin, have invented a new and useful Improvement in Seed-Tubes for Corn-Planters; and I do hereby declare the following to be a full, clear, and exact description thereof, which will enable others skilled in the art to which my invention appertains to make and use the same, reference being had to the accompanying drawing, forming part of this specification, in which—

Figure 1 is a rear view of my invention. Fig. 2 is a vertical central section of the same, taken on line $d\ d$, drawn vertically through Fig. 3; and Fig. 3 is a side or edge view of the same.

Similar letters of reference indicate corresponding parts in the several figures of the drawing.

My invention relates to seed-tubes for corn-planters, and has for its object to so construct the same as to enable the person operating the machine to see at all times the amount of seed in the tube, by which means any defect in the operation of the dropping device can be seen should the same become clogged or fail to perform its necessary function; and the improvement consists in providing the rear and edges of the lower portion of the tube with apertures communicating with the receptacle, within which is secured the discharge-valve, a description of which will be hereinafter more fully given.

In the accompanying drawing, A represents the tube, which may be made of wood or metal, as found most desirable in use, the lower portion of which is slightly enlarged and V-shaped, as shown in the drawing. Within said tube is secured a discharge-valve, B, which is pivoted to the front and rear sides of the tube in a manner admitting of an oscillating movement. The lower portion of said valve is provided with one or more vertical slots, $a$, or of any other desired shape and size, which extend from near the lower end of the same upward to a point near its fulcrum.

I provide the edges of the tube, above the enlarged or V-shaped portion, with apertures C C, which communicate with the inner side of the same.

I also provide the rear of the tube, below the curve of the V portion, with apertures D D, communicating with the inner side, by which light is introduced into the receptacle, thus enabling the operator to see the amount of seed therein through the apertures in the side of the tube. Said apertures, both in the tube and valve, may be covered with a wire screen, if thought desirable.

My invention may be used by hand, or it may be attached to any power-planter having the proper mechanism to operate the valve.

The operation of my invention is as follows: A sufficient amount of seed to form the hill is introduced into the upper end of the tube by the action of the moving parts of the planter, which is dropped to the receptacle of the tube, and is then discharged upon the ground at the proper time by the tilting movement of the valve imparted by the mechanical movement of the machine, which simultaneously discharges a similar amount into the upper end of the tube upon the opposite side of the valve, which is conveyed to the receptacle and discharged upon the ground in a like manner by the backward tilting movement of the valve.

It will be seen that by my invention I not only hold the seed in sight of the operator, thereby insuring a knowledge that the seed is being deposited and that the machine is not clogged, but the seed is in sight so near the ground as to render it much easier to deposit the same on the mark when planting in check-rows. This latter feature I regard as of much importance to the successful operation of the machine.

By the employment, also, of the perforated or slotted valve the operator has an unobstructed view of the seed when in the tube on the opposite side of the valve to that from which the operator is stationed or looking.

Having thus described the nature and object of my invention, what I claim as new, and desire to secure by Letters Patent, is—

1. The discharge-valve of a seed-planter constructed with apertures to permit the operator to see the grain in the receptacle or spout on the opposite side of the valve, substantially as herein described.

2. In combination with the slotted or perforated valve, the seed-tube provided with one or more side openings, so that the seed to be dropped is held in view of the operator from the outside, at or near the point at which the seed enters the ground, substantially as herein described.

LEVI SCOFIELD.

Witnesses:
N. C. GRIDLEY,
L. J. FARWELL.